Sept. 27, 1927.  H. WEICHSEL  1,643,398

SYNCHRONOUS MOTOR

Filed Dec. 31, 1923

INVENTOR
Hans Weichsel
BY E. E. Huffman
ATTORNEY

Patented Sept. 27, 1927.

1,643,398

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

SYNCHRONOUS MOTOR.

Application filed December 31, 1923. Serial No. 683,546.

My invention relates to separately excited synchronous alternating current motors, and its object is to provide means whereby the direct current excitation will increase, with increasing load, in accordance with the degree of angular displacement between the axis of the inducing field and the axis of the direct current magnetization through the rotor. Some of the advantages of my invention are that a separately excited synchronous motor may be caused to operate with satisfactory efficiency at fractional loads as well as at full load, and that the machine may be constructed without defined polar projections and with small air gap, as in induction motors, and may therefore have good starting characteristics.

Figure 1:
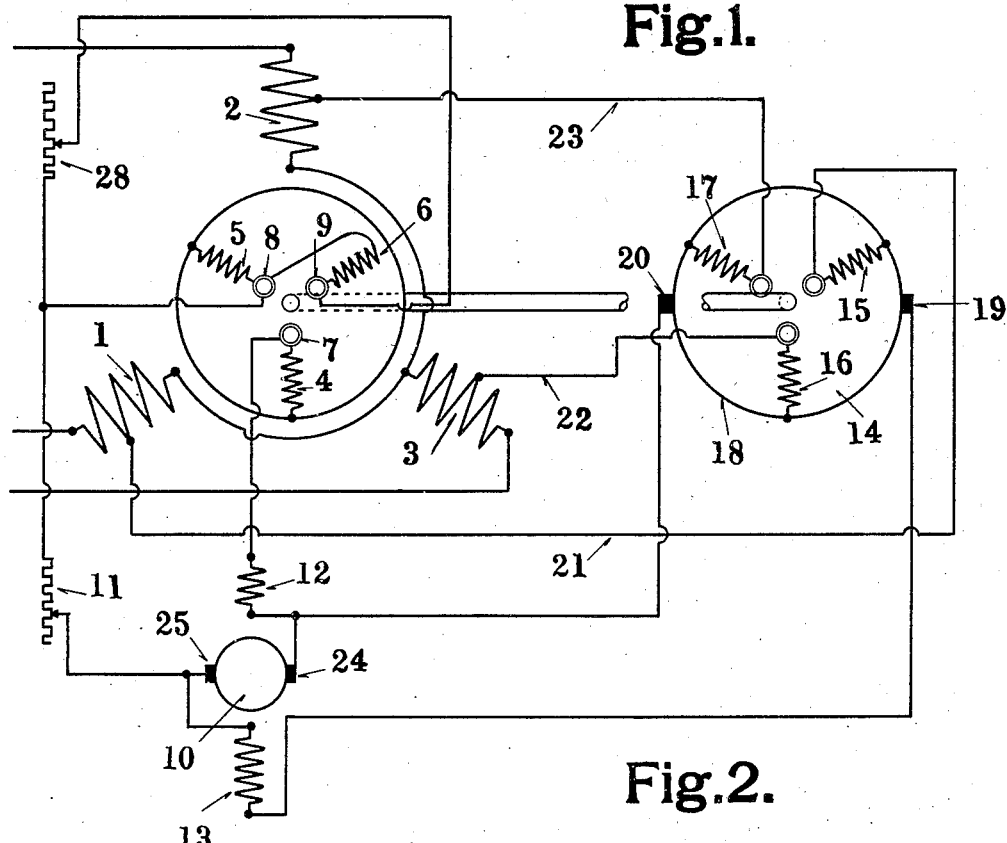
Figure 2:
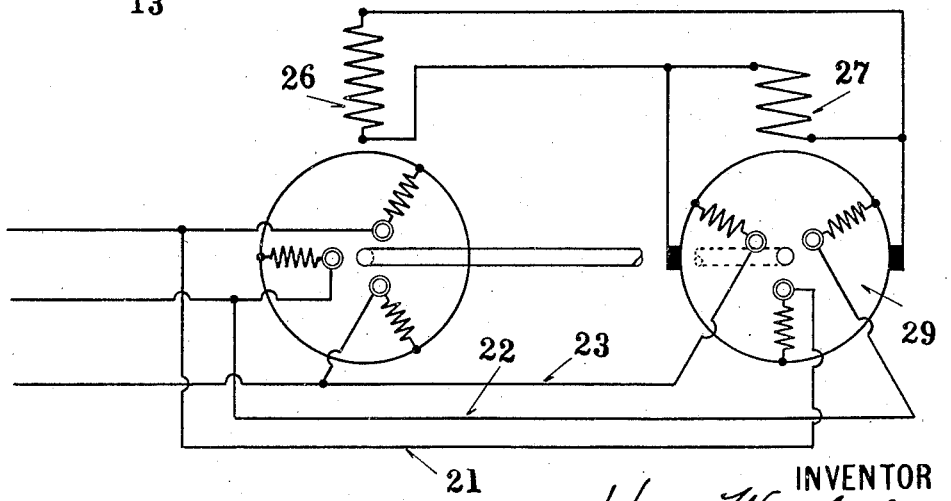

In the accompanying drawings Figure 1 illustrates a three-phase synchronous motor and associated machines embodying my invention; and Figure 2 illustrates a modification.

Referring to Figure 1, the stator is provided with star connected polyphase windings 1, 2 and 3, and the rotor with polyphase windings 4, 5 and 6 connected to slip rings 7, 8 and 9. In the running condition of the machine, winding 6 is inactive, and windings 4 and 5 are connected in series and to the slip rings 7 and 8, which are in circuit with the direct current exciter 10, through variable resistance 11. The exciter is provided with a series exciting winding 12, and a shunt exciting winding 13.

On the rotor shaft of the main motor or geared thereto, I provide a translating device 14, which, in the form shown, is a rotary converter having polyphase windings 15, 16 and 17, and a commuted winding 18, with which brushes 19, 20 cooperate. By means of conductors 21, 22 and 23, connected to intermediate points on the main motor windings 1, 2 and 3, an alternating current E. M. F. proportional to the line E. M. F. is impressed on the windings 15, 16 and 17. The brushes 19, 20 are connected in circuit with the brushes 24, 25 of the direct current exciter 10 through the shunt exciting winding 13, connections being so made that the winding 13 and the series exciting winding 12 magnetize in the same direction, and that the E. M. F. derived from the translating device 14 is in the same direction as the E. M. F. generated by the exciter 10.

Referring to the operation of the machine, and assuming that at a given fractional load the angular displacement between the axis of the rotating field magnetization and the axis of the rotating direct current rotor magnetization of the main machine, is 15 electrical degrees, an increase of load will increase this angle, and since the rotor of the translating device 14 is mechanically connected with the rotor of the main motor, the angular position of the magnetization produced by the polyphase windings 15, 16 and 17, will shift accordingly, it being understood of course that while these windings produce a rotating field, the rotation of the member carrying the windings results in this field being stationary in space. It will be apparent, therefore, that change in the angular relations of the magnetization in the main motor, will result in change of the angular relation between the axis of the brushes 19, 20, and the axis of the field of the machine 14, and the connections are so arranged that increase of the angular displacement between the stator and rotor magnetization axes of the main machine, results in an increase of the direct current E. M. F. appearing at brushes 19, 20, and impressed upon the shunt exciting circuit of the exciter 10. This increases the exciting current delivered by the exciter to the rotor of the main motor. The exciter 10 may be either geared to be driven by the main motor, or by an independent source of power.

It will be understood that although the essential principle of my invention would be secured if the winding 12 were omitted or other modification made in the exciter field circuits, by the compound excitation of the exciter shown in Figure 1, the excitation of the motor is caused to increase at a more rapid rate with increasing load, and the motor's overload capacity is greater than if winding 13 were the sole source of excitation.

In Figure 2 is shown a modification in which the exciting and inducing fields (at synchronism) are stationary in space, and the direct current derived from the translating device 29, geared to the motor, is supplied directly to the direct current exciting winding 26 of the motor without the use of a separate exciter. In the apparatus of Figure 2 a converter is illustrated as the translating device and I prefer to provide it with a separate exciting winding 27, although such a winding may be omitted as in the machine 14 of Figure 1.

The motor of Figure 1 may be started by connecting slip rings 8 and 9 through a suitable resistance 28, thus producing a rotor closed circuit through the winding 6 in addition to and in a different axis from the closed circuit including the windings 4 and 5. It will be understood that translating devices other than converters may be employed for influencing the excitation of the motor, and other modifications may be made in the apparatus herein described without departing from the scope of my invention as defined by the appended claims.

Having fully described my invention, what I claim as new and desire to secure by Letters Patent of the United States is:

1. In a synchronous motor, the combination of a rotor and a stator, one of said members being provided with means for producing a direct current exciting flux, means for impressing an alternating E. M. F. on the other member to produce an alternating current field flux, and means independent of the motor and mechanically governed by variation in the angular displacement between the axes of the said rotor and stator fields and adapted to increase, throughout the load range of the motor, the magnitude of the exciting field when the angular displacement between said axes increases.

2. In a synchronous motor, the combination of a rotor and a stator, one of said members being provided with a winding for producing a direct current exciting flux, means for impressing an alternating current E. M. F. on the other member to produce an alternating field flux, a converter mechanically connected to and driven by the motor, means for supplying alternating current to the converter of such periodicity as to permit direct current to be derived from the converter when the motor is operating at synchronous speed, direct current brushes on the converter connected with the direct current exciting winding of the motor, said brushes occupying, when the motor is operating synchronously without load, a position approximating coinciding with the axis of the field produced by the alternating current winding of the converter, whereby when the angular displacement between the axis of the exciting flux and the axis of the alternating field flux of the motor increases under increase of load the direct current voltage derived from the converter by the brushes increases.

3. In a synchronous motor, the combination of a rotor and a stator, one of said members being provided with a winding for producing a direct current exciting flux, means for impressing an alternating E. M. F. on the other member to produce an alternating current field flux, and a translating device independent of the motor and having a part rotating in synchronism therewith and adapted to produce a direct current E. M. F. increasing, throughout the load range of the motor, with increase in the angular displacement between the axes of said rotor and stator fields, and means for impressing said direct current E. M. F. on the exciting winding.

4. In a synchronous motor, the combination of a rotor and a stator, one of said members being provided with means for producing a direct current exciting flux, means for impressing an alternating current E. M. F. on the other member to produce an alternating field flux, a converter mechanically connected to and driven by the motor, means for supplying alternating current to the converter of such periodicity as to permit direct current to be derived from the converter when the motor is operating at synchronous speed, direct current brushes on the converter, said brushes occupying, when the motor is operating synchronously without load, a position approximating coinciding with the axis of the field produced by the alternating current winding of the converter, whereby when the angular displacement between the axis of the exciting flux and the axis of the alternating field flux of the motor increases under increase of load the direct current voltage derived from the converter by the brushes increases, and means for utilizing said direct current voltage for influencing the magnitude of the direct current exciting field of the motor.

5. In a synchronous motor, the combination of a rotor and a stator, one of said members being provided with means for producing a direct current exciting flux, means for impressing an alternating E. M. F. on the other member to produce an alternating current field flux, a translating device driven by the motor and provided with slip rings and brushes, means for impressing upon the slip rings an alternating E. M. F. proportional to the line E. M. F. impressed on the motor, said translating device being also provided with a commuted winding and with brushes, said brushes being so positioned that, throughout the normal load range of the motor, the E. M. F. appearing at said brushes increases when the angle between the rotor and stator fields increases, and means for utilizing said E. M. F. for influencing the magnitude of the direct current exciting flux of the motor.

6. In a synchronous motor, the combination of a stator and a rotor, one of said members being provided with a winding connected to an alternating current source for producing an alternating field flux and the other being provided with an exciting winding, a source of direct current E. M. F. in circuit with said exciting winding, a translating device operating in synchronism with the motor and adapted to produce a direct current E. M. F. varying with variations in the angular displacement between the alternating current field of the motor and the field produced by the exciting winding, and means for utilizing said E. M. F. to vary the E. M. F. produced by the first mentioned source of direct current E. M. F.

7. In a synchronous motor, the combination of a stator and rotor, one of said members being provided with a winding for producing an alternating field flux and the other being provided with an exciting winding, a direct current generator in circuit with said exciting winding, a translating device operating in synchronism with the motor and adapted to produce a direct current E. M. F. varying with variations in the angular displacement between the alternating current field of the motor and the field produced by the exciting winding, and means for utilizing said E. M. F. to vary the E. M. F. produced by the direct current generator.

8. In a synchronous motor, the combination of a stator and a rotor, one of said members being provided with a winding connected to an alternating current source for producing an alternating field flux and the other with a winding for producing a direct current exciting flux, a direct current generator in circuit with said last mentioned winding, a converter operating in synchronism with the motor and having its direct current side connected to vary the excitation of the generator, and means for impressing on the alternating current side of the converter a voltage having fixed phase relation to the line voltage.

9. In a synchronous motor, the combination of a stator and a rotor, one of said members being provided with a winding for producing an alternating field flux and the other with a winding for producing a direct current exciting flux, a direct current generator provided with series and shunt exciting windings and in circuit with said last mentioned winding, and a converter operating in synchronism with the motor and having its direct current side in circuit with the shunt winding of the generator.

In testimony whereof, I have hereunto set my hand this the 28th day of December, 1923.

HANS WEICHSEL.